United States Patent
Day et al.

(10) Patent No.: US 10,454,118 B2
(45) Date of Patent: Oct. 22, 2019

(54) CURRENT COLLECTORS FOR SOLID OXIDE FUEL CELL STACKS

(75) Inventors: Michael J. Day, Columbus, OH (US); Scott L. Swartz, Columbus, OH (US); Matthew M. Seabaugh, Columbus, OH (US); Paul H. Matter, Columbus, OH (US)

(73) Assignee: NEXCERIS INNOVATION HOLDINGS, LLC, Lewis Center, OH (US)

( * ) Notice: Subject to any disclaimer, the term of this patent is extended or adjusted under 35 U.S.C. 154(b) by 1717 days.

(21) Appl. No.: 12/633,606

(22) Filed: Dec. 8, 2009

(65) Prior Publication Data

US 2010/0167169 A1 Jul. 1, 2010

Related U.S. Application Data

(60) Provisional application No. 61/120,686, filed on Dec. 8, 2008.

(51) Int. Cl.
*H01M 4/90* (2006.01)
*H01M 8/02* (2016.01)
*H01M 8/0232* (2016.01)

(52) U.S. Cl.
CPC ................ *H01M 8/0232* (2013.01)

(58) Field of Classification Search
CPC ............. H01M 8/0232; H01M 8/0236; H01M 8/0241; H01M 4/9066
USPC ........................................................ 429/486
See application file for complete search history.

(56) References Cited

U.S. PATENT DOCUMENTS

| | | | |
|---|---|---|---|
| 4,702,971 A | 10/1987 | Isenberg | |
| 5,273,837 A * | 12/1993 | Aitken et al. | 429/496 |
| 5,589,285 A | 12/1996 | Cable et al. | |
| 5,639,578 A | 6/1997 | Urry | |
| 6,803,141 B2 | 10/2004 | Pham et al. | |
| 7,244,526 B1 | 7/2007 | Meinhardt et al. | |
| 7,736,787 B2 | 6/2010 | Day et al. | |
| 2003/0027033 A1 | 2/2003 | Seabaugh et al. | |
| 2003/0232230 A1 | 12/2003 | Carter et al. | |
| 2004/0121222 A1 | 6/2004 | Sarkar et al. | |
| 2005/0019636 A1 | 1/2005 | Kwon et al. | |
| 2005/0227133 A1 | 10/2005 | Gorte et al. | |
| 2006/0197264 A1* | 9/2006 | Cutler et al. | 264/618 |
| 2006/0234100 A1 | 10/2006 | Day et al. | |
| 2006/0280998 A1 | 12/2006 | Ying et al. | |
| 2007/0180689 A1 | 8/2007 | Day et al. | |
| 2007/0184324 A1 | 8/2007 | Lyons et al. | |
| 2007/0238007 A1 | 10/2007 | Katagiri et al. | |
| 2008/0152981 A1 | 6/2008 | Katagiri et al. | |

(Continued)

FOREIGN PATENT DOCUMENTS

WO 0124300 A1 4/2001
WO 2007093759 8/2007

*Primary Examiner* — Ula C Ruddock
*Assistant Examiner* — Frank A Chernow
(74) *Attorney, Agent, or Firm* — Porter Wright Morris & Arthur LLP

(57) ABSTRACT

A sulfur tolerant anode current collector material includes a mesh or foam that includes a cermet. The cermet includes a metallic component and a ceramic component. The metallic component includes nickel, an alloy including nickel and cobalt, or a mixture including a nickel compound and a cobalt compound. The ceramic component includes a mixed conducting electrolyte material.

22 Claims, 7 Drawing Sheets

(56) References Cited

U.S. PATENT DOCUMENTS

2008/0254336 A1* 10/2008 Batawi .......................... 429/33
2009/0148742 A1   6/2009 Day et al.
2009/0148743 A1   6/2009 Day et al.

* cited by examiner

CURRENT COLLECTORS FOR SOLID OXIDE FUEL CELL STACKS

RELATED APPLICATIONS

This application claims priority under 35 U.S.C. § 119(e) to U.S. Provisional Application Ser. No. 61/120,686, filed Dec. 8, 2008.

FIELD OF THE INVENTION

This invention relates to materials and fabrication processes for current collector components used to facilitate current collection at the anode of solid oxide fuel cells. The disclosed materials and processes are particularly well suited to applications in which long-term stability, high efficiency operation, sulfur tolerance, and operation on carbon-containing fuels is desirable. This invention is also directed to solid oxide fuel cells incorporating the current collectors, such cells may be used, inter alia, for producing power from hydrocarbons and hydrogen-containing fuels, solid oxide electrolysis systems for producing hydrogen or other fuels.

BACKGROUND OF THE INVENTION

Demand for efficient and reliable electrical power is escalating and outpacing the improvements in conventional power sources. Applications where compact, lightweight, energy-dense power supplies would find immediate application include portable power generators, combined heat and power systems, and auxiliary power units for vehicles. Concerns about global climate change are increasing with the level of $CO_2$ in our atmosphere, caused by the use of combustion-based methods to generate power from fossil fuels. Fuel cells offer a viable approach to increase efficiency of power generation from fossil fuels, while greatly reducing emissions of pollutants and greenhouse gases. Of the various types of fuel cells, the proton exchange membrane (PEM) fuel cell, which operates with hydrogen as a fuel, is receiving considerable attention due to its low weight, low-temperature operation, and ease of manufacture. However, the operation of PEM fuel cells with fossil-based hydrocarbon fuels requires extensive pre-processing (reforming) to convert the hydrocarbons into a hydrogen rich gas, and subsequent gas purification steps to reduce carbon monoxide and sulfur to very low levels (CO<10 ppm and $H_2S$<10 ppb). Solid oxide fuel cells (SOFCs), which operate at high temperature (typically, 600 to 1000° C.), are much less sensitive to impurities in hydrocarbon fuels, which minimizes the amount of gas purification steps required. This greatly increases power generation efficiency and reduces system complexity. It also is theoretically possible to operate solid oxide fuel cells directly on certain hydrocarbon fuels (e.g., methane, methanol and ethanol) via internal reforming, i.e., without an initial reforming step.

A solid oxide fuel cell is comprised of an oxygen ion conducting ceramic electrolyte membrane that is sandwiched by a fuel electrode (anode) and an air electrode (cathode). Power is generated by passing air (or oxygen) over the cathode and fuel (e.g., hydrogen plus carbon monoxide) over the anode, and collecting the electrical current that is created by the electrochemical reaction of oxygen with fuel to form steam and carbon dioxide. Ceramic electrolyte materials used in solid oxide fuel cells can include yttrium-stabilized zirconia (YSZ), scandia-stabilized zirconia (ScSZ), zirconium oxide doped with any combination of rare earth and/or alkaline earth elements, samarium-doped ceria (SDC), gadolinium-doped ceria (GDC), cerium oxide (ceria) doped with any combination of rare earth and/or alkaline earth elements, lanthanum strontium magnesium gallium oxide (LSGM), and other oxygen-ion-conducting ceramic electrolyte materials known to those skilled in the art. A key to successful development of SOFC systems is the electrochemical cell design and "stacking" configuration (or the manner in which SOFC elements are configured within a power-producing SOFC module). In this regard, it is important to pack a large amount of active area for electrochemical reactions within the smallest volume possible. A typical solid oxide fuel cell will generate about 30 to 40 watts of power for every 100 $cm^2$ of active area—this translates to more than about 3000 $cm^2$ of active area for a kilowatt of power.

Planar SOFCs, which may be supported by either the anode material or the electrolyte material, also have been demonstrated extensively. Two recent U.S. patent application Ser. No. 11/109,471 (published Oct. 19, 2006) and Ser. No. 11/220,361 (published Mar. 8, 2007), both disclosures of which are incorporated by reference herein, describe novel planar cell designs that overcome technical barriers associated with building SOFC stacks with conventional planar cells. These cell designs will generally be referred to herein as the FlexCell and the HybridCell. The FlexCell design is based on a thin electrolyte membrane layer that is mechanically supported by a "honeycomb" mesh layer of electrolyte material. With the FlexCell, more than 75 percent of the electrolyte membrane within the active area is thin (20 to 40 microns), and the periphery of the cell is dense. Electrode (anode and cathode) layers are subsequently deposited onto the major faces within the active cell regions to complete the fabrication of an SOFC based on the FlexCell design. With the HybridCell, an anode layer (30 to 40 microns) is co-sintered between the mesh support layer and the electrolyte membrane layer. With the HybridCell, the entire active cell area has a thin electrolyte membrane (10 to 20 microns), and the periphery of the cell is dense. The cathode layers are subsequently deposited onto the major faces within the active cell region to complete the fabrication of an SOFC based on the HybridCell design.

In order to generate useful amounts of electrical power, planar SOFCs are configured in a "stack", with multiple planar cells separated by planar electrical interconnect components that conduct electricity between the cells and define the flow paths for oxidant (air or oxygen) through the cathode channels and fuel ($H_2$, CO, $CH_4$, etc.) through the anode channels (see FIG. 1). In some planar stack designs, conductive foams or meshes are included within the stack to facilitate current collection. For example, cathode current collectors are placed between the interconnect and the cathode face of the planar SOFC cell, and anode current collectors are placed between the interconnect and the anode face of the planar SOFC cell. The present invention addresses these current collector components and, in particular, anode current collector components.

For SOFCs to be of practical application, they must operate using fuels that are easily available. This requires that power supplies operate on conventional fuels, such as natural gas, propane, gasoline, and diesel. Typically, a hydrocarbon fuel is pre-reacted (reformed) over a catalyst with air and/or steam to produce a mixture of $H_2$ and CO (and in some cases $CH_4$) gas before delivery to the fuel cell. Promising development is underway to provide compact and lightweight reformers for conventional fuels. However, traditional fuels contain some level of sulfur. Sulfur can have devastating effects on conventional SOFC performance.

Cermet mixtures, which comprise both a metallic component and a ceramic component, and, in particular, typically comprise mixtures of nickel metal with electrolyte materials (YSZ or GDC), are the most common SOFC anodes, but are susceptible to sulfur poisoning in concentrations as low as a few ppm. This leads to significant performance degradation, especially at lower operating temperatures (700 to 800° C.) which are desired for SOFC stacks that utilize inexpensive metallic interconnect components. A recent patent application, U.S. patent application Ser. No. 12/001,062, filed on Dec. 7, 2007, the disclosure of which is incorporated by reference herein, discloses SOFC anode compositions that are tolerant to sulfur and comprise a composite of a nickel-cobalt alloy and a ceria-based electrolyte material (e.g., samarium doped cerium oxide).

With this multilayer nickel-cobalt/ceria anode formulation, sulfur tolerance has been demonstrated when hydrogen is the fuel (see FIG. 2). Without intending to be bound by any theory, it is believed that the mechanism for this sulfur tolerance involves the conduction of both oxygen ions and electrons through the anode, which results in the conversion of $H_2S$ to $SO_x$, thereby minimizing the absorption of $H_2S$ onto active sites (see FIG. 3). Although this mechanism of sulfur tolerance provides exceptional sulfur tolerance when hydrogen is the fuel, sulfur is rarely present in pure hydrogen. Sulfur is present in fuels that are derived from hydrocarbon fuels, so that after reforming the fuel consists essentially of hydrogen and carbon monoxide in conjunction with residual $H_2S$. For optimum efficiency of power generation in an SOFC, this carbon monoxide must be utilized as fuel. When sulfur is not present, the carbon monoxide is consumed by the sequential steps of: (1) water gas-shift reaction, whereby CO and $H_2O$ react to form $CO_2$ and $H_2$; and (2) electrochemical oxidation of $H_2$ to $H_2O$ at the SOFC anode. In essence, the water-gas-shift reaction followed by electrochemical oxidation of hydrogen is much faster than direct electrochemical oxidation of CO. Unfortunately, the presence of $H_2S$ poisons the water-gas-shift reaction, so that CO cannot be efficiently utilized as fuel in an SOFC. The sulfur tolerant anodes have provided improved SOFC performance.

However, there remains a need for SOFC's with further improved performance, particularly using readily available hydrocarbon fuels.

SUMMARY OF THE INVENTION

Accordingly, the present invention is directed to current collector materials, for example anode current collector materials, which overcome various disadvantages of the prior art. Additionally, the present invention is directed to solid oxide fuel cells including such anode current collectors and methods of manufacturing such anode current collector materials.

In one embodiment, the invention is directed to a sulfur tolerant anode current collector material including a mesh or foam that includes a cermet. The cermet includes a metallic component and a ceramic component. The metallic component includes nickel, an alloy including nickel and cobalt, or a mixture including a nickel compound and a cobalt compound. The ceramic component includes a mixed conducting electrolyte material.

In another embodiment, the invention is directed to solid oxide fuel cell for use with a reducing gas. In one embodiment, the solid oxide fuel cell includes a cathode layer, a ceramic electrolyte layer positioned adjacent the cathode layer, an anode layer positioned adjacent the ceramic electrolyte layer, and a sulfur tolerant anode current collector layer positioned adjacent the anode layer. The sulfur tolerant anode current collector layer includes a mesh or foam that includes a cermet. The cermet includes a metallic component and a ceramic component. The metallic component includes nickel, an alloy including nickel and cobalt, or a mixture including a nickel compound and a cobalt compound. The ceramic component includes a mixed conducting electrolyte material.

In another embodiment, the solid oxide fuel cell includes a cathode layer, a ceramic electrolyte layer positioned adjacent the cathode layer, an anode layer positioned adjacent the ceramic electrolyte layer, and a sulfur tolerant anode current collector layer positioned adjacent the anode layer. The sulfur tolerant anode current collector layer includes a cermet material that conducts electricity by transport of both electrons and oxygen ions.

In another embodiment, the invention is directed to a method of manufacturing an anode current collector mesh or foam. The method includes the steps of providing a powdered anode precursor, providing a slurry of the powdered anode precursor and a ceramic material in a fluid, infiltrating the slurry into a polymeric reticulated mesh or foam to produce an infiltrated mesh or foam, calcining the infiltrated mesh or foam to produce a calcined material, sintering the calcined material to produce a sintered material, and reducing the sintered material in the presence of hydrogen or a reducing gas mixture. The powdered anode precursor includes a nickel oxide, a composition including nickel oxide and at least one other metal oxide, or a mixture thereof. The at least one other metal oxide includes cobalt oxide, iron oxide, copper oxide, or a mixture thereof.

The materials for the current collectors and fuel cells of the invention are advantageous in exhibiting improved sulfur tolerance, thereby providing improved fuel cell performance with hydrocarbon fuels. Additional embodiments of the invention, along with additional advantages thereof, will be apparent in view of the following detailed description.

BRIEF DESCRIPTION OF THE DRAWINGS

The following detailed description will be more fully understood in view of the drawing in which.

Figure 1:
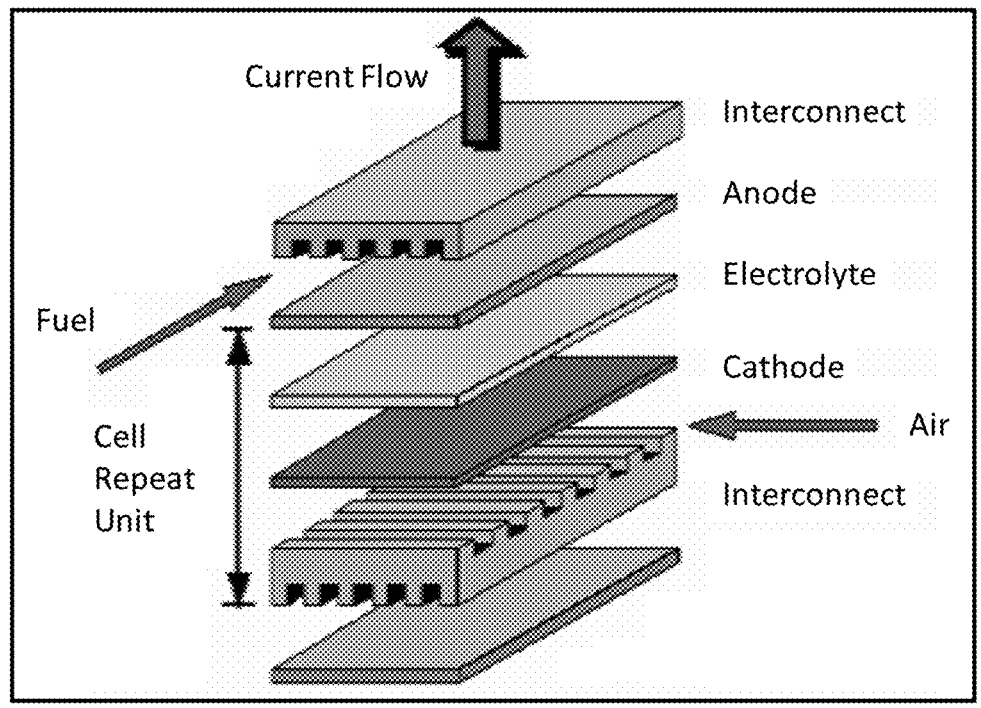
FIG. 1 shows a schematic diagram of a conventional planar solid oxide fuel cell stack.
Figure 2:
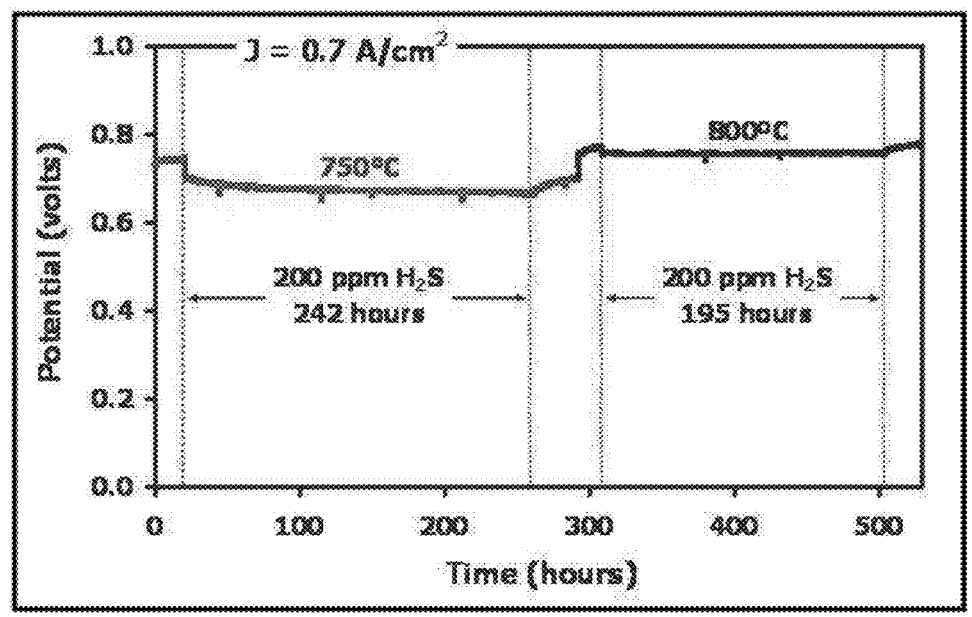
FIG. 2 shows sulfur tolerance achieved in a FlexCell fuel cell with hydrogen as fuel and using a multilayer nickel-cobalt/ceria anode formulation.
Figure 3:
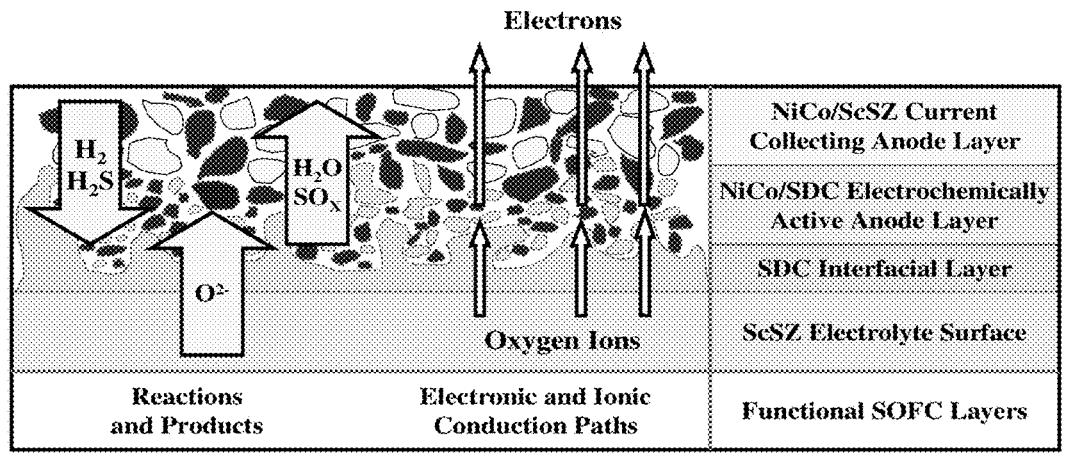
FIG. 3 shows a schematic diagram of a possible mechanism of sulfur-tolerance achieved using the multilayer nickel-cobalt/ceria anode formulation.

The embodiments set forth in the drawing are illustrative in nature and are not intended to be limiting of the invention defined by the claims. Moreover, individual features of the drawing and the invention will be more fully apparent and understood in view of the detailed description.

DETAILED DESCRIPTION

The present invention is directed to anode current collector materials, solid oxide fuel cells including such anode current collector materials, and methods of manufacturing anode current collector materials. The following detailed description shows various modes of carrying out the invention. The description is not to be taken in a limiting sense, but is made for the purpose of illustrating the general principles of the invention.

In one embodiment of the present invention, a sulfur tolerant anode current collector material includes a mesh or foam that includes a cermet. As will be understood by one skilled in the art, a mesh or foam, as used herein, includes wire-woven meshes, expanded metal meshes, foams and/or any other mesh or foam material as known in the art. In addition, although the mesh or foam will be described herein as a single layer, it will be understood by those skilled in the art that the teachings disclosed herein could equally apply to two, three or any number of mesh or foam layers. In one embodiment of the present invention, the mesh or foam can be comprised of the cermet. In yet another embodiment, the mesh or foam can be comprised of the cermet and a metallic base material, wherein the mesh or foam can be infiltrated, as discussed further herein, by the cermet and the cermet coated onto the metallic base material.

As will be understood by one skilled in the art, a cermet, as used herein, includes both a metallic component and a ceramic component. In these embodiments, the metallic component may comprise nickel, an alloy including nickel and cobalt, or a mixture including a nickel compound and a cobalt compound, and the ceramic component comprises a mixed conducting electrolyte material. In another embodiment, the metallic component may include additional metals such as iron, iron oxide, copper, copper oxide, or any other material as known in the art.

In another embodiment of the present invention, the mesh or foam of the sulfur tolerant anode current collector may include a cermet and a metallic material. In one embodiment, the metallic material may include nickel, copper, ferritic stainless steel, or a combination thereof. It will be understood that ferritic stainless steel may include, for example, those materials known as Crofer 22-APU, E-Brite, and SS-441, and others as known in the art. In another embodiment, the mesh or foam may include at least 20 wt % of the cermet material and, in one preferred embodiment, the mesh or foam may include at least 40 wt % of the cermet material.

The invention also provides an anode current collector for a solid oxide fuel cell for use with a reducing gas. In one embodiment, the solid oxide fuel cell may include a cathode layer, a ceramic electrolyte layer positioned adjacent the cathode layer, an anode layer positioned adjacent the ceramic electrolyte layer, and a sulfur tolerant anode current collector layer positioned adjacent the anode layer. The sulfur tolerant anode current collector layer may include a mesh or foam that includes a cermet, as described herein. The ceramic component may include a mixed conducting electrolyte material. In another embodiment, the solid oxide fuel cell for use with a reducing gas may also include an interconnect layer positioned adjacent the sulfur tolerant anode current collector layer.

The anode current collectors of the present invention may be prepared by a method employing a slurry of a powdered anode precursor and a ceramic material in a fluid, such as, for example, water. As will be appreciated, the ceramic material, as described herein, may be of any size as known in the art. The powdered anode precursor may suitably comprise a nickel oxide, a composition including nickel oxide and at least one other metal oxide, or a mixture thereof, wherein the at least one other metal oxide is selected from cobalt oxide, iron oxide, copper oxide, and mixtures thereof. As will be understood by one skilled in the art, the powdered anode precursor composition may include single phase solid solutions, two phase compositions or any other material as known in the art. The method may further include infiltrating the slurry into a polymeric reticulated foam, such as, for example, a polymer-based foam, to produce an infiltrated foam. Suitable polymers include, but are not limited to polyurethanes, polypropylenes, polyolefins, polyethylene, polystyrene, and polyvinyl chloride. In one embodiment, a polypropylene foam is employed. As will be appreciated, a polymer foam will be transformed during calcining and sintering, discussed herein, so that the final current collector material can have the polymer foam structure although the polymer itself is removed. As used in the present specification the term "infiltrate" is intended to mean coating the internal surfaces of a structure, whether a foam or mesh, by dip-coating, electrophoretic deposition, or any other method as known in the art. The infiltrated foam is then calcined to produce a calcined material, followed by sintering the calcined material to produce a sintered material and reducing the sintered material in the presence of hydrogen or a reducing gas mixture. In one embodiment, the ceramic material may include a mixed conducting electrolyte material. In a specific embodiment, the ceramic material may include a doped zirconia electrolyte material, a doped ceria electrolyte material, or a combination thereof.

In additional specific embodiments, the mixed conducting electrolyte material may be a doped ceria electrolyte material, a doped zirconia electrolyte material, a lanthanum strontium magnesium gallium oxide (LSGM), another oxygen-ion-conducting ceramic electrolyte material, or a combination thereof. The doped ceria electrolyte material may be a gadolinium doped ceria, a samarium doped ceria, a zirconium doped ceria, a scandium doped ceria, a yttrium doped ceria, a calcium doped ceria, a strontium doped ceria, cerium oxide (ceria) doped with at least one element selected from rare earth and alkaline earth elements, or a combination thereof. The doped zirconia electrolyte material may be a yttrium doped zirconia, a scandium doped zirconia, a calcium doped zirconia, zirconium oxide (zirconia) doped with at least one element selected from rare earth and alkaline earth elements, or a combination thereof. It will be understood that the mixed conducting electrolyte materials may include other dopants so long as they do not interfere with electrolyte function.

In one embodiment, the cermet may comprise 20 to 80 percent by weight of an ceramic electrolyte material selected from gadolinium doped ceria, samarium doped ceria, or a combination thereof. In one specific embodiment, the cermet may comprise 40 to 60 percent by weight of an ceramic electrolyte material selected from gadolinium doped ceria, samarium doped ceria, or a combination thereof. In another embodiment, the mesh or foam may comprise at least 5 mg/cm$^2$, at least 10 mg/cm$^2$, at least 15 mg/cm$^2$ and at least 20 mg/cm$^2$ of the cermet material. However, as will be appreciated, because the ceramic electrolyte material can be transformed during calcining and sintering, the measurements of ceramic electrolyte material discussed above are typically measured prior to any calcining and/or sintering.

Without intending to be bound by theory, it is believed that the mixed-conducting electrolyte material in the cermet current collector anode not only provides enhanced electrochemical performance but also is important to sulfur tolerance of a fuel cell. In addition, without intending to be bound by any theory, it is also believed that the mixed conductive cermet provides more active sites for sulfur oxidation and more facile nickel sulfide oxidation. Furthermore, it is believed that the sulfur tolerance is achieved by extending the conduction of oxygen ions into the current collector so that the water gas shift reaction is not poisoned and carbon monoxide is effectively utilized as fuel.

The usefulness of the anode current collector materials described in this invention will be evident from the testing results as described in the following Examples.

Example 1

Solid oxide fuel cells were prepared for subsequent use in fuel cell testing with novel anode current collector foams as described herein in Examples 2, 4, 6, 10, 11, and 12. A 10×10 cm FlexCell fuel cell substrate was made from ScSZ-6 (Scandia-doped zirconia, 6 mol % $Sc_2O_3$) electrolyte material with an active area of 28 cm$^2$. Cells were fabricated with cobalt-doped SDC (scandium doped ceria) interfacial layers on both the anode and cathode faces, with a bi-layer anode on the anode face, and with a bi-layer cathode on the cathode face. Cells were fabricated as described below:

Deposition of Interfacial Layer Coatings:

Cobalt-doped SDC interfacial layer coatings were prepared according to known aerosol spray deposition methods. Cobalt-doped SDC interfacial layer ink was prepared using samarium-doped ceria powders of the composition $(Ce_{0.80}Sm_{0.20})O_{1.90}$ (SDC-20). The ink was prepared by dispersing SDC-20 powders into a terpineol based an ink vehicle. The SDC-20 powders in this ink had four different surface areas: 30 percent with a surface area of 6.0 m$^2$/gram, 40 percent with a surface area of 9.3 m$^2$/gram, 20 percent with a surface area of 27 m$^2$/gram, and 10 percent with a surface area of 45 m$^2$/gram. A cobalt addition was made by adding cobalt (III) 2,4 pentanedionate in an amount corresponding to approximately one percent of cobalt metal relative to the total amount of SDC-20 powder in the ink. The cobalt-doped SDC interfacial layer ink was then made into two separate spray solutions. The first solution was prepared by diluting a portion of the SDC/Co ink with acetone and the second solution was prepared by diluting a portion of SDC/Co ink with acetone and adding 2.5 wt % graphite (solids basis). These solutions were sprayed onto both sides of the FlexCell substrate. A first cobalt-doped coating (without graphite) was spray deposited onto one face of the FlexCell substrate and dried and then the SDC/Co/C coating (with graphite) was spray deposited onto the first coating in the same manner and dried. The procedure was repeated to deposit a two-layer ceria interfacial layer onto the opposite face of the FlexCell substrate. The interfacial layer coated FlexCell substrate then was heated in a furnace to 1300° C. for one hour to sinter the interfacial layer coatings and adhere them to the FlexCell substrate. Spray deposition parameters were controlled such that the total interfacial layer thickness was approximately 2-3 microns and each component layer of the interfacial layer was approximately 1-2 microns thick.

Preparation of Electrochemically Active Anode Precursor Powder:

NiO—CoO solid solution powder ($Ni_{0.76}Co_{0.24}O$) containing a small amount of nanoscale samarium-doped ceria (SDC-15, $Ce_{0.85}Sm_{0.15}O_{1.925}$) was prepared. The first step was the preparation of a mixture that contained 112.5 grams of nickel oxide (NiO), 37.50 grams of cobalt oxide ($Co_3O_4$), and 3 grams of nanoscale SDC-15 powder having a surface area of 195 m$^2$/gram. This mixture was ball milled in acetone with zirconia grinding media and the resulting slurry was dried to a powder. The dried NiO—CoO/SDC powder was calcined at 1000° C. then sieved through a 35 mesh sieve to complete preparation of the coarse NiO—CoO/SDC precursor powder. Fine NiO—CoO/SDC precursor powder was made by the same initial procedure but after calcination the NiO—CoO/SDC powder was vibratory milled in acetone with zirconia grinding media to reduce its particle size. The vibratory milled NiO—CoO/SDC slurry then was dried to complete preparation of the fine NiO—CoO/SDC precursor powder.

Preparation of Electrochemically Active Anode Ink:

NiO—CoO/SDC Anode precursor powder prepared as described above was used to prepare electrochemically active anode inks as follows. Samarium-doped ceria powder of the composition $(Ce_{0.9}Sm_{0.10})O_{1.95}$ (SDC-10) was prepared with different surface areas. A mixture was prepared that contained 30 grams of coarse NiO—CoO/SDC precursor powder, 30 grams of fine NiO—CoO/SDC precursor, 35 grams of SDC-10 powder with a surface area of 6.0 m$^2$/gram, and 5 grams of SDC-10 powder with a surface area of 45 m$^2$/gram. This powder mixture then was ball milled in acetone with zirconia grinding media and dried. A portion of this powder was dispersed into a terpineol based ink vehicle to prepare the electrochemically active anode ink.

Preparation of Current Carrying Anode Ink:

Fine NiO Anode Precursor Powder was made by vibratory milling of nickel oxide (NiO, Novamet Standard Type) in acetone with zirconia grinding media followed by drying. A mixture was prepared that contained 50 grams of non-milled nickel oxide powder (NiO, Novamet Standard Type), 50 grams of fine NiO precursor, and 25 grams of scandia-stabilized zirconia powder (ScSZ, 10 mole percent $Sc_2O_3$, 3-5 microns particle size. This mixture was ball milled in acetone with zirconia grinding media and the resulting slurry was dried to a powder. A portion of this powder was dispersed into a terpineol based ink vehicle to prepare NiO/ScSZ current carrying anode ink.

Deposition of Anode Coatings:

The two-layer anode was applied to the anode face of the interfacial-layer-coated FlexCell fuel cell prepared above. The first, electrochemically active (NiO—CoO/SDC) anode layer, was applied by painting onto the sintered interfacial layer using a foam brush followed by drying. The second, current carrying (NiO/ScSZ), anode layer was applied by painting onto the dried electrochemically active anode coating using a foam brush followed by drying. The anode-coated FlexCell substrate then was heated in a furnace to 1300° C. to sinter the anode layers and adhere them to the ceria interfacial layer. The amounts of deposited anode coatings were controlled such that the total anode thickness was approximately 30 microns and each component layer of the bi-layer anode was approximately 15 microns thick.

Preparation of Electrochemically Active Cathode Ink:

Gadolinium-doped ceria powder of the composition $(Ce_{0.9}Gd_{0.10})O_{1.95}$ (GDC-10) was prepared with different surface areas. Zinc-doped lanthanum strontium ferrite of the composition $(La_{0.60}Sr_{0.40})(Zn_{0.10}Fe_{0.90})O_{3-X}$ (LSZF) powder was prepared with different surface areas. A mixture was prepared that contained 125 grams of LSZF powder with a surface area of 1.6 m$^2$/gram, 125 grams of LSZF powder with a surface area of 4.2 m$^2$/gram, 50 grams of GDC-10 powder with a surface area of 2.9 m$^2$/gram, and 200 grams of GDC-10 powder with a surface area of 8.3 m$^2$/gram. This powder mixture then was ball milled in acetone with zirconia grinding media and the resulting slurry was dried to a powder. A portion of this powder was dispersed into an ink vehicle along with an amount of palladium 2/4 pentanedionate sufficient to make a 0.35 wt % palladium (relative to total solids in the ink) to complete preparation of the electrochemically active cathode ink.

Preparation of Current Carrying Cathode Ink:

Zinc-doped lanthanum strontium ferrite of the composition $(La_{0.60}Sr_{0.40})(Zn_{0.10}Fe_{0.90})O_{3-X}$ (LSZF) powder was prepared with two different surface areas. A mixture was prepared that contained 375 grams of LSZF powder with a surface area of 2.2 m$^2$/gram and 125 grams of LSZF powder with a surface area of 4.8 m$^2$/gram. This powder mixture then was ball milled in acetone with zirconia grinding media and the resulting slurry was dried to a powder. A portion of this powder was dispersed into an ink vehicle, along with an amount of palladium 2/4 pentanedionate sufficient to make a 0.70 wt % palladium (relative to total solids in the ink), to complete preparation of the current carrying cathode ink.

Deposition of Cathode Coatings:

The two-layer cathode was applied to the cathode face of the interfacial-layer-coated FlexCell prepared above (after anode deposition and sintering). The first, electrochemically active (LSZF/GDC/Pd), cathode layer was applied by painting onto the sintered interfacial layer using a foam brush and then dried. The second, current carrying (LSZF/Pd), cathode layer was applied by painting onto the dried electrochemically active cathode coating using a foam brush and then dried. The cathode-coated FlexCell substrate then was heated in a furnace to 1125° C. to sinter the cathode layers and adhere them to the ceria interfacial layer. The amounts of deposited cathode coatings were controlled such that the total cathode thickness was approximately 30 microns and each component layer of the bi-layer cathode was approximately 15 microns thick.

Example 2

A solid oxide fuel cell was prepared from a 10×10 cm FlexCell substrate made from ScSZ-6 electrolyte material with an active area of 28 cm$^2$. This cell was fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those as described in Example 1. The anode current collector for this large-area cell was as-received pure nickel foam. The contact paste used between the anode and the current collector foam was a Ni/NiO ink that was prepared as follows:

Preparation of NiO Precursor Ink:

NiO Precursor Powder was Ball Milled in acetone with zirconia grinding media and dried. A portion of this powder was dispersed into a terpineol based ink vehicle to prepare NiO precursor ink.

Preparation of NiO Precursor Ink:

Ni metal precursor powder was dispersed into a terpineol based ink vehicle to prepare Ni metal precursor ink.

Preparation of Anode Contact Paste:

50 grams NiO ink and 50 grams Ni metal ink, prepared as described above, was combined to prepare the anode contact paste.

Figure 4:
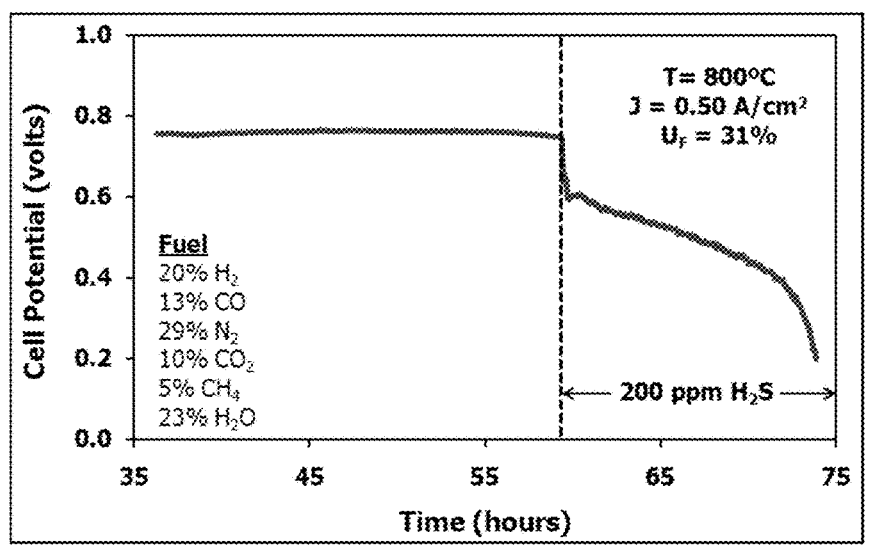
FIG. 4 shows a plot of the effect of 200 ppm $H_2S$ on voltage stability at 800° C. with simulated hydrocarbon reformate as fuel in a FlexCell fuel cell having the anode formulation consisting of 60 weight percent of $(NiO_{0.75}CoO_{0.25})$ and 40 weight percent of SDC-15, tested with unmodified nickel foam as the anode current collector.

The SOFC performance of this large-area cell was tested using simulated hydrocarbon reformate (20% $H_2$, 13% CO, 29% $N_2$, 10% $CO_2$, 5% $CH_4$, and 23% $H_2O$) as the fuel and air as the oxidant. The anode was not stable in the presence of 200 ppm $H_2S$ when tested with fuel of this composition (see FIG. 4 for an example of the observed degradation). Mass spectrometry was used to analyze anode exhaust composition, and it was confirmed that the Water-Gas Shift reaction was suppressed by the presence of $H_2S$ (see Table 1 displayed herein).

Example 3

Figure 5:
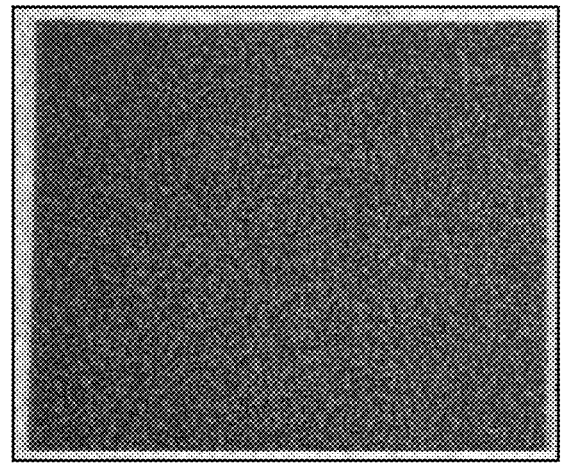
FIG. 5 shows a picture of the Ni—Co/ceria cermet foam current collector as fabricated in Example 3.
Figure 6:
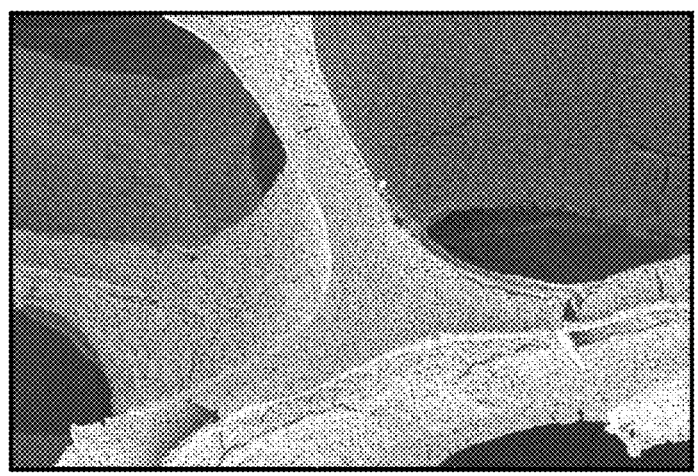
FIG. 6 shows a SEM micrograph showing the cellular morphology of the Ni—Co/ceria cermet foam current collector of FIG. 5.

Sulfur tolerant cermet foam anode current collectors that exhibit high sulfur tolerant properties were made infiltrating a polymeric foam templates with anode material, and subsequently burning out the polymer template (see FIGS. 5 and 6). The resulting foam was composed of 100% of the sulfur tolerant anode material. This foam was prepared for subsequent use in Example 4. The sulfur tolerant anode current collectors were fabricated as follows:

Preparation of Anode Current Collector Precursor Powder.

NiO—CoO solid solution powder ($Ni_{0.75}Co_{0.25}O$) containing a small amount of nanoscale samarium-doped ceria (SDC-15, $Ce_{0.85}Sm_{0.15}O_{1.925}$) was prepared for subsequent use in current collector foam fabrication, described below. The first step was the preparation of a mixture that contained 312.5 grams of nickel oxide (NiO), 187.50 grams of cobalt oxide ($CO_3O_4$), and 10 grams of nanoscale SDC-15 powder having a surface area of 195 $m^2$/gram. This mixture was ball milled in acetone with zirconia grinding media and the resulting slurry was dried to a powder. The dried NiO—CoO/SDC powder was calcined at 1000° C. then sieved through a 35 mesh sieve to complete preparation of the coarse NiO—CoO/SDC precursor powder. Fine NiO—CoO/SDC precursor powder was made by the same initial procedure but after calcination the NiO—CoO/SDC powder was vibratory milled in acetone with zirconia grinding media to reduce its particle size. The vibratory milled NiO—CoO/SDC slurry then was dried to complete preparation of the fine NiO—CoO/SDC precursor powder.

Preparation of the Anode Slurry.

NiO—CoO/SDC anode precursor powder prepared as described above was used to prepare electrochemically active anode slurry for current collection foams as follows. Samarium-doped ceria powder of the composition ($Ce_{0.85}Sm_{0.15})O_{1.95}$ (SDC-15) was prepared to a surface area of 8 $m^2$/gram. A mixture was prepared that contained 450 grams of the fine NiO—CoO/SDC precursor powder above and 300 grams of SDC-15 powder with a surface area of 8.0 $m^2$/g. This powder mixture then was ball milled in acetone with zirconia grinding media and dried. 70.5 grams of powder produced as described above (surface area of ~8-15 $m^2$/g) was dispersed in 27.0 grams of water to make a slurry and combining with Duramax D-3021 dispersant (0.41 g), Surfynol SE-F surfactant (0.30 g), and methyl cellulose as a binder (1.29 g). This slurry was slowly ball milled with GDC media for 16 hours to ensure thorough mixing of the components. The resulting slurry had the composition consisting of 60 weight percent of ($Ni_{0.75}Co_{0.25}$) and 40 weight percent of SDC-15.

Fabrication of Cermet Foam Anode Current Collectors.

The slurry prepared above was infiltrated into polymeric foam using a wash-coat technique, and excess slurry was removed using a dense foam roller. The infiltrated polymer template foams were sintered to 1300° C. for 2 hours in air to burn out the polymer template leaving the sintered oxide sample remaining. The resulting foam pieces were reduced in a heat treatment to 1300° C. in a 5% hydrogen forming gas.

Example 4

Figure 7:
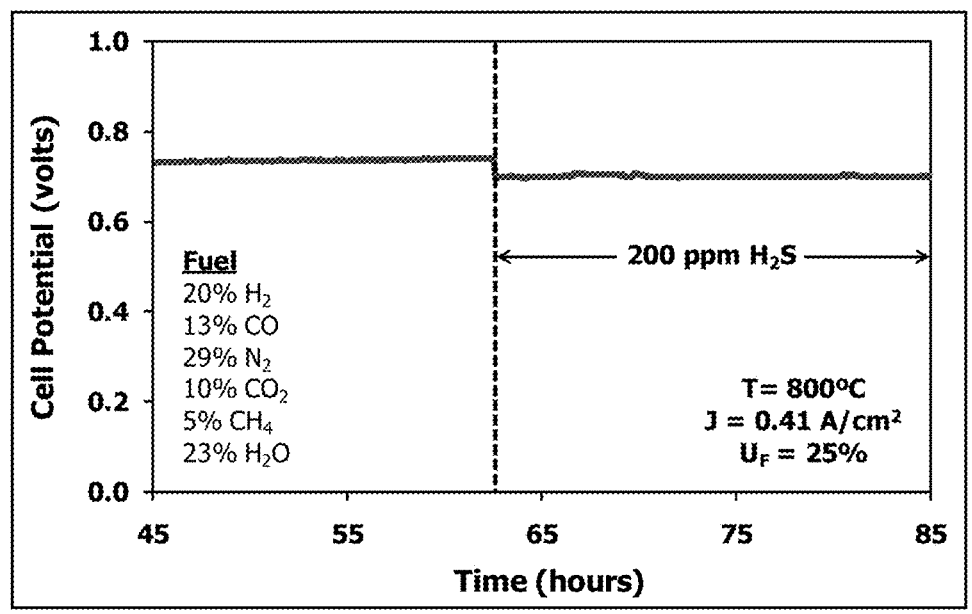
FIG. 7 shows a plot of the effect of 200 ppm $H_2S$ on voltage stability at 800° C. with simulated hydrocarbon reformate fuel in a FlexCell fuel cell having the anode formulation consisting of 60 weight percent of $(NiO_{0.75}CoO_{0.25})$ and 40 weight percent of SDC-15, tested with a cermet foam anode current collector made of the composition consisting of 60 weight percent of $(NiO_{0.75}CoO_{0.25})$ and 40 weight percent of SDC-15.

A solid oxide fuel cell was prepared from a 10×10 cm FlexCell substrate made from ScSZ-6 electrolyte material with an active area of 28 $cm^2$. This cell was fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those as described in Example 1. The SOFC performance of this large-area cell was tested using a cermet foam anode current collector, fabricated as described in Example 3. The contact paste used between the anode and the current collector foam was a NiO—CoO/SDC ink that was prepared by dispersing a portion of the precursor powder, which was prepared as described in Example 3, into a terpineol based ink vehicle to prepare NiO—CoO/SDC anode contact paste. Simulated hydrocarbon reformate JP-8 (20% $H_2$, 13% CO, 29% $N_2$, 10% $CO_2$, 5% $CH_4$, and 23% $H_2O$), with and without 200 ppm $H_2S$, was used as the fuel and air as the oxidant. These data, shown in FIG. 7, confirm that the disclosed anode foam current collector has enhanced sulfur tolerant properties. The use of a Ni—Co/ceria cermet foam current collector was effective in suppressing degradation by $H_2S$ with simulated reformate as fuel, and mass spectrometry analysis of the anode exhaust during this test confirmed that the WGS reaction was not suppressed when $H_2S$ was introduced (these data also are provided in Table 1 displayed herein).

Example 5

Sulfur tolerant cermet foam anode current collectors that exhibit high sulfur tolerant properties were made infiltrating a polymeric foam templates with anode material, and subsequently burning out the polymer template. The resulting foam was composed of 100% of the sulfur tolerant anode material. This foam was prepared for subsequent use in Example 6. The sulfur tolerant anode current collectors were fabricated as follows:

Preparation of Anode Current Collector Precursor Powder.

NiO—CoO solid solution powder ($Ni_{0.625}Co_{0.375}O$) containing a small amount of nanoscale samarium-doped ceria (SDC-15, $Ce_{0.85}Sm_{0.15}O_{1.925}$) was prepared for subsequent use in current collector foam fabrication, described below. The first step was the preparation of a mixture that contained 312.5 grams of nickel oxide (NiO), 187.50 grams of cobalt oxide ($CO_3O_4$), and 10 grams of nanoscale SDC-15 powder having a surface area of 195 $m^2$/gram. This mixture was ball milled in acetone with zirconia grinding media and the resulting slurry was dried to a powder. The dried NiO—CoO/SDC powder was calcined at 1000° C. then sieved through a 35 mesh sieve to complete preparation of the coarse NiO—CoO/SDC precursor powder. Fine NiO—CoO/SDC precursor powder was made by the same initial procedure but after calcination the NiO—CoO/SDC powder was vibratory milled in acetone with zirconia grinding media to reduce its particle size. The vibratory milled NiO—CoO/SDC slurry then was dried to complete preparation of the fine NiO—CoO/SDC precursor powder.

Preparation of the Anode Slurry.

NiO—CoO/SDC anode precursor powder prepared above was used to make an anode slurry for current collection foams as described in Example 3. Samarium-doped ceria powder of the composition ($Ce_{0.85}Sm_{0.15})O_{1.95}$ (SDC-15) was added to the precursor powder, and an aqueous slurry was prepared as described in Example 3. This resulting slurry had the composition consisting of 60 weight percent of ($Ni_{0.75}Co_{0.25}$) and 40 weight percent of SDC-15.

Fabrication of Cermet Foam Anode Current Collectors.

The slurry prepared above was infiltrated into polymeric foam using the same methods and thermal treatments as described in Example 3.

Example 6

Figure 8:
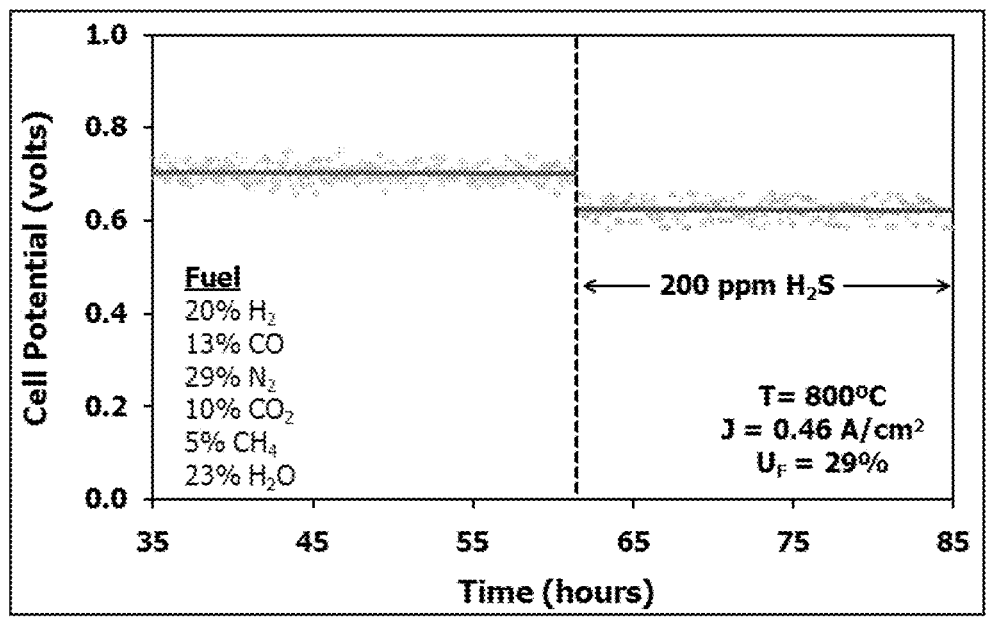
FIG. 8 shows a plot of the effect of 200 ppm $H_2S$ on the voltage stability at 800° C. with simulated hydrocarbon reformate fuel in a FlexCell fuel cell having the anode formulation, consisting of 60 weight percent of $(NiO_{0.75}CoO_{0.25})$ and 40 weight percent of SDC-15, tested with a cermet foam anode current collector made of the composition consisting of 60 weight percent of $(NiO_{0.75}CoO_{0.25})$ and 40 weight percent of SDC-15.

A solid oxide fuel cell was prepared from a 10×10 cm FlexCell substrate made from ScSZ-6 electrolyte material with an active area of 28 $cm^2$. This cell was fabricated with cobalt-doped SDC interfacial layers, electrochemically active (NiO—CoO/SDC) and current carrying (NiO/ScSZ) anode layers, and electrochemically active (LSZF/GDC/Pd)

and current carrying (LSZF/Pd) cathode layers identical to those as described in Example 1. The SOFC performance of this large-area cell was tested using a cermet foam anode current collector, fabricated as described in Example 5. The contact paste used between the anode and the current collector foam was a NiO—CoO/SDC ink that was prepared by dispersing a portion of the precursor powder, which was prepared as described in Example 5, into a terpineol based ink vehicle to prepare NiO—CoO/SDC anode contact paste. Simulated hydrocarbon reformate JP-8 (20% $H_2$, 13% CO, 29% $N_2$, 10% $CO_2$, 5% $CH_4$, and 23% $H_2O$), with and without 200 ppm $H_2S$, was used as the fuel and air as the oxidant. These data, shown in FIG. 8, confirm that the disclosed anode foam current collector has enhanced sulfur tolerant properties, similar to those as described in Example 4. The use of a Ni—Co/ceria cermet foam current collector was effective in suppressing degradation by $H_2S$ with simulated reformate as fuel, and mass spectrometry analysis of the anode exhaust during this test confirmed that the WGS reaction was not suppressed when $H_2S$ was introduced (this data is also provided in Table 1 displayed herein).

TABLE 1

Anode exhaust compositions for single-cell tests with simulated reformate fuels (*).

| $CO/CO_2$ ratio | Nickel Current Collector | Cermet Current Collector |
|---|---|---|
| Sulfur-free fuel | 0.75 | 0.73 |
| 200 ppm $H_2S$ in fuel | 1.05 | 0.73 |
| Equilibrium | 0.73 | 0.73 |

(*) Fuel composition: 20% $H_2$, 13% CO, 10% $CO_2$, 5% $CH_4$, 29% $N_2$, 23% $H_2O$.

Example 7

Figure 9:
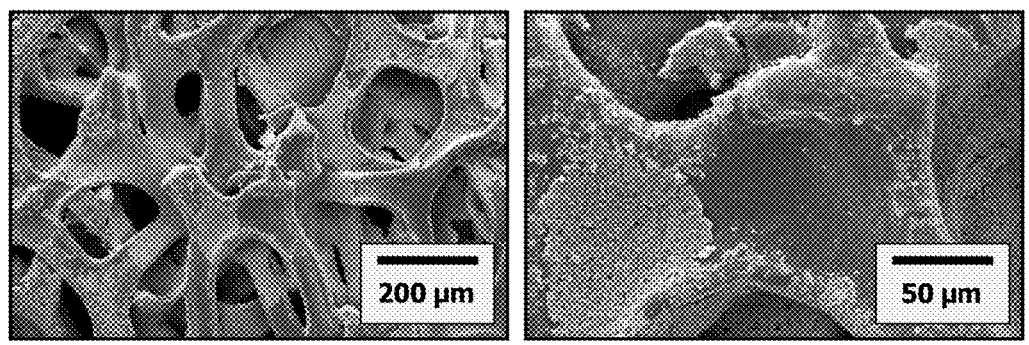
FIG. 9 shows SEM Micrographs of nickel foam infiltrated with approximately 5.6 mg/cm$^2$ of Ni—Co/ceria sulfur tolerant anode material as described in Example 7.

A sulfur tolerant anode current collector was made by infiltrating an as-received nickel metal foam with Ni—Co/SDC anode material, through a dip-coating process. The resulting foam was coated with the sulfur tolerant anode material over the nickel foam substrate, which provided more mechanical integrity and ductility compared to the cermet foam prepared as described in Examples 3 and 5. This foam was prepared for subsequent use in Example 10 to determine the effect of solids loading on the morphology of coatings. A slurry of the sulfur tolerant anode current collector material, of composition consisting of 60 weight percent of $(Ni O_{0.75} Co O_{0.25})$ and 40 weight percent of SDC-15, was prepared using the precursor anode current collector powder and the methods as described in Example 5. The nickel foam was coated in the slurry using a dip-coat technique, the excess was removed by lightly shaking the foam, and the foam was dried. The infiltrated foam pieces were reduced in a heat treatment to 1050° C. for 1 hour in 5% hydrogen forming gas. The resulting dip-coated foam had an infiltrant loading of 5.6 mg/cm² of foam area. SEM micrographs of the Ni—Co/ceria dip-coated foam current collector are shown in FIG. 9, and show that with this loading, incomplete coverage of the nickel foam substrate was obtained. A single cell test, discussed in Example 10, was conducted to explore the impact of this coating on sulfur tolerance with reformate fuel.

Example 8

Figure 10:
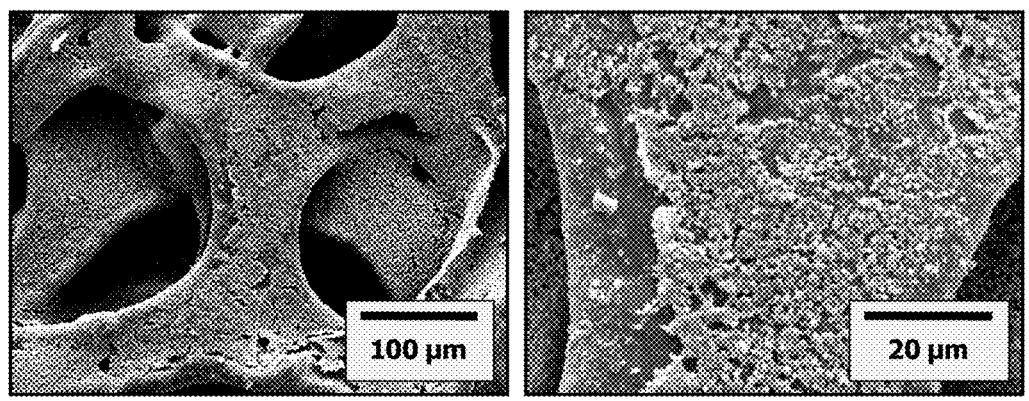
FIG. 10 shows SEM Micrographs of nickel foam infiltrated with approximately 12.2 mg/cm$^2$ of Ni—Co/ceria sulfur tolerant anode material as described in Example 8.

Sulfur tolerant anode current collectors were made by infiltrating as-received nickel metal foams with anode material, through a dip-coating process. The resulting foam was coated with the sulfur tolerant anode material over the nickel foam substrate. This foam was prepared for subsequent use in Example 12 to determine the effect of solids loading on the morphology of coatings. A slurry of the sulfur tolerant anode current collector material, of composition consisting of 60 weight percent of $(Ni O_{0.75} Co O_{0.25})$ and 40 weight percent of SDC-15, was prepared using the precursor anode current collector powder and the methods as described in Example 5. The nickel foam was coated in the slurry using a dip-coat technique, the excess was removed by lightly shaking the foam, and the foam was dried. The infiltrated foam pieces were reduced in a heat treatment to 1050° C. for 1 hour in 5% hydrogen forming gas. The process of dip-coating, drying, and heat treatment to 1050° C. was repeated twice more. The resulting dip-coated foam had a infiltrant loading of 12.2 mg/cm² of foam area. SEM micrographs of the triple dip-coated Ni—Co/ceria foam current collector are shown in FIG. 10 and show that with this loading incomplete coverage of the nickel foam substrate was obtained, but was improved upon the foam prepared in Example 7. A single cell test, discussed in Example 12, was conducted to explore the impact of this coating on sulfur tolerance with reformate fuel.

Example 9

Figure 11:
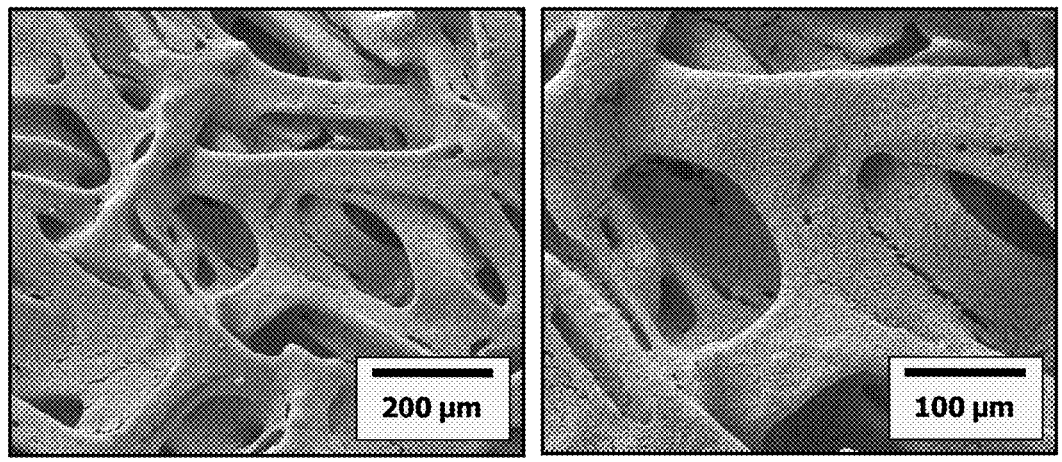
FIG. 11 shows SEM Micrographs of nickel foam infiltrated with approximately 19.1 mg/cm$^2$ of Ni—Co/ceria sulfur tolerant anode material as described in Example 9.

Sulfur tolerant anode current collectors were made by infiltrating as-received nickel metal foams with anode material, through a dip-coating process. The resulting foam was coated with the sulfur tolerant anode material over the nickel foam substrate. This foam was prepared for subsequent use in Examples 11 and 12 to determine the effect of solids loading on the morphology of coatings. A slurry of the sulfur tolerant anode current collector material, of composition consisting of 60 weight percent of $(Ni O_{0.75} Co O_{0.25})$ and 40 weight percent of SDC-15, was prepared using the precursor anode current collector powder and the methods as described in Example 5. The nickel foam was coated in the slurry using a dip-coat technique, the excess was removed by lightly shaking the foam, and the foam was dried. The dried foam was then dip-coated a second time and was dried. The infiltrated foam piece was reduced in a heat treatment to 1050° C. for 1 hour in 5% hydrogen forming gas. The process of dip-coating, drying, and heat treatment to 1050° C. was repeated once more. The resulting dip-coated foam had a infiltrant loading of 19.1 mg/cm² of foam area. SEM micrographs of the Ni—Co/ceria dip-coated foam current collector are shown in FIG. 11. These images show that, with this high loading, complete coverage of the nickel foam substrate was obtained, which was a great improvement over the foams prepared in Examples 7 and 8. Single cell tests, discussed in Examples 11 and 12, were conducted to explore the impact of this coating on sulfur tolerance with reformate fuel.

Example 10

Figure 12:
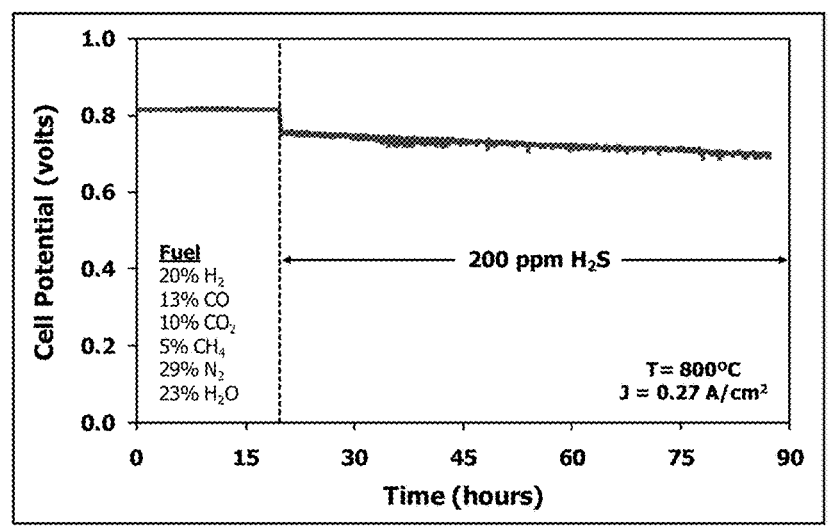
FIG. 12 shows a plot of the effect of 200 ppm $H_2S$ on voltage stability with simulated hydrocarbon reformate fuel, conducted with a nickel foam anode current collector infiltrated with approximately 5.6 mg/cm$^2$ of Ni—Co/ceria anode material.

A solid oxide fuel cell was prepared from a 10×10 cm FlexCell substrate made from ScSZ-6 electrolyte material with an active area of 28 cm². This cell was fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those as described in Example 1. The SOFC performance of this large-area cell was tested using a nickel foam dip-coated with Ni—Co/SDC anode current collector, fabricated as described in Example 7. The contact paste used between the anode and the current collector foam was a NiO—CoO/SDC ink that was prepared by dispersing a portion of the precursor powder, which was prepared as described in Example 5, into a terpineol based ink vehicle to prepare NiO—CoO/SDC anode contact paste. Simulated hydrocarbon reformate (20% $H_2$, 13% CO, 29% $N_2$, 10% $CO_2$, 5% $CH_4$, and 23% $H_2O$), with and without 200 ppm $H_2S$, was used as the fuel and air as the oxidant. Compared to the stable performance of a cell using the polymer pre-formed cermet foam (Examples 4 and 6), significant steady-state degradation was observed upon introduction of $H_{2S}$ when using a nickel foam dip-coated with a low solids loading of 5.6 mg/cm² of foam area (see FIG. 12). This result indicates insufficient Ni—Co/SDC anode material was deposited on to the nickel foam.

Example 11

Figure 13:
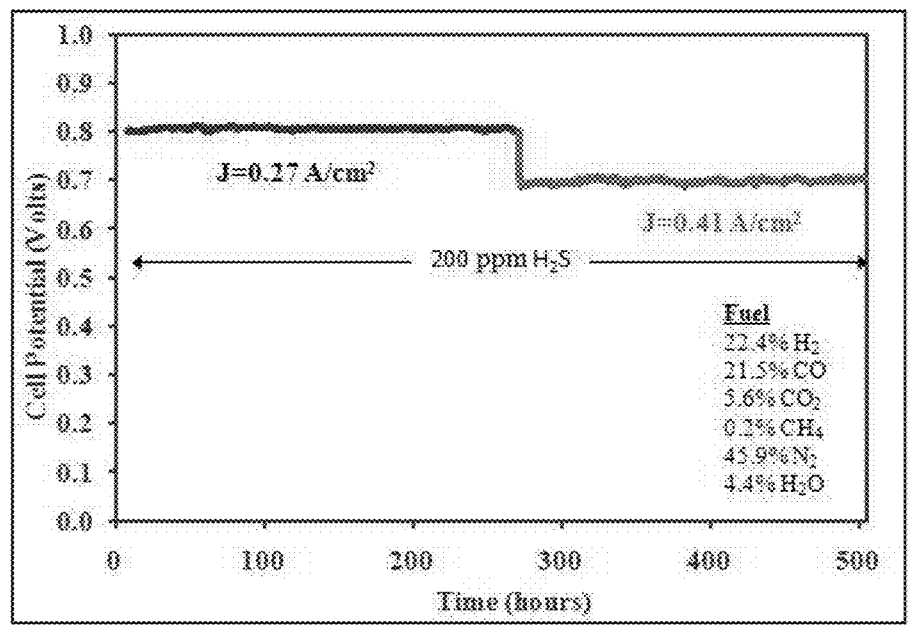
FIG. 13 shows a plot of the long-term voltage stability obtained at 800° C. with simulated hydrocarbon reformate fuel having 200 ppm $H_2S$, conducted with a nickel foam anode current collector that was infiltrated with 19.1 mg/cm$^2$ of Ni—Co/ceria anode material, at current densities of $J=0.27$ A/cm$^2$ and $J=0.41$ A/cm$^2$.

A solid oxide fuel cell was prepared from a 10×10 cm FlexCell substrate made from ScSZ-6 electrolyte material with an active area of 28 cm². This cell was fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those as described in Example 1. The SOFC performance of this large-area cell was tested using a nickel foam dip-coated with NI—CO/SDC anode current collector, fabricated as described in Example 9. The contact paste used between the anode and the current collector foam was a NiO—CoO/SDC ink that was prepared by dispersing a portion of the precursor powder, which was prepared as described in Example 5, into a terpineol based ink vehicle to prepare NiO—CoO/SDC anode contact paste. Simulated hydrocarbon reformate (22.2% $H_2$, 21.5% CO, 5.6% CO, 0.2% $CH_4$, 45.9% $N_2$, and 4.4% $H_2O$), with and without 200 ppm $H_2S$, was used as the fuel and air as the oxidant. The cell operated initially at 0.27 A/cm², to compare the performance to the cell in FIG. 12. This cell showed good stability over 250 hours of operation on sulfur; therefore, the current density was increased 0.41 A/cm² to match the current density of the cermet foam experiment shown in FIG. 7. At this higher current density, the cell continued to operate without any degradation in 200 ppm $H_{2S}$ (see FIG. 13).

Example 12

Figure 14:
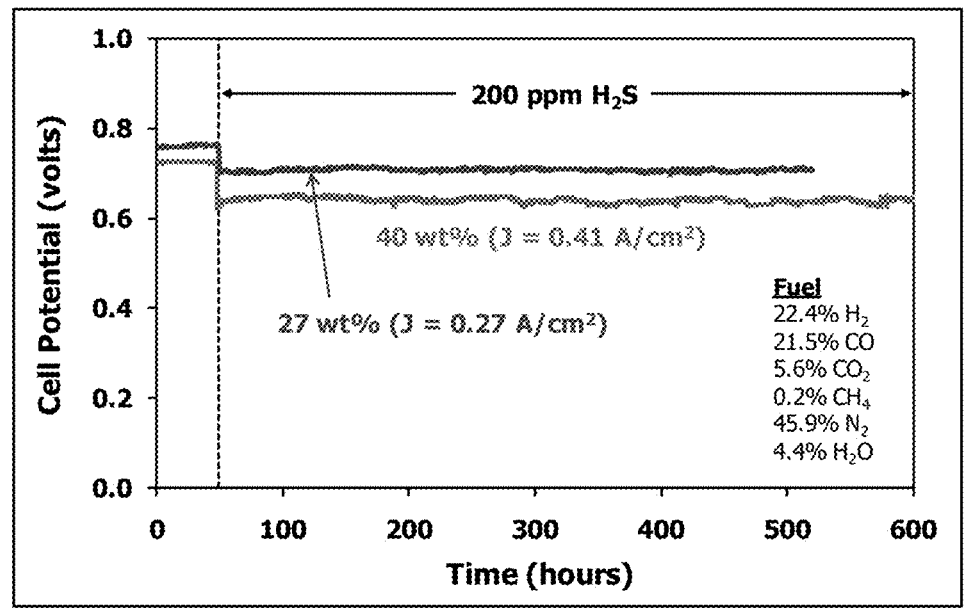
FIG. 14 shows a plot of the long-term voltage stability obtained with two identical FlexCells fuel cells at 800° C. with simulated reformate fuel having 200 ppm $H_2S$, conducted with nickel foam anode current collector infiltrated with 5.6 and 12.2 mg/cm$^2$ of Ni—Co/ceria anode material, wherein the time scale was normalized for comparison purposes, and current density was 0.27 A/cm$^2$ for the cell tested with an anode current collector having 12.2 mg/cm$^2$ of Ni—Co/ceria anode material, and current density was 0.41 A/cm$^2$ for the cell tested with an anode current collector having 12.2 mg/cm$^2$ of Ni—Co/ceria anode material.

Solid oxide fuel cells were prepared from 10×10 cm FlexCell substrates made from ScSZ-6 electrolyte material with an active area of 28 cm². These cells were fabricated with cobalt-doped SDC interfacial layers, electrochemically active (NiO—CoO/SDC) and current carrying (NiO/ScSZ) anode layers, and electrochemically active (LSZF/GDC/Pd) and current carrying (LSZF/Pd) cathode layers identical to those as described in Example 1. The SOFC performance of large-area cells were tested using nickel foams dip-coated with Ni—Co/SDC anode current collector, fabricated as described in Examples 8 and 9. The contact paste used between the anode and the current collector foam was a NiO—CoO/SDC ink that was prepared by dispersing a portion of the precursor powder, which was prepared as described in Example 5, into a terpineol based ink vehicle to prepare NiO—CoO/SDC anode contact paste. Simulated hydrocarbon reformate (22.4% $H_2$, 21.5% CO, 5.6% CO, 0.2% $CH_4$, 45.9% $N_2$, and 4.4% $H_2O$) with and without 200 ppm $H_2S$, was used as the fuel and air as the oxidant. FIG. 14 demonstrates long-term stable performance obtained for 500-hour durations with nickel-foam current collectors infiltrated with 12.2 and 19.1 mg/cm² of foam area, respectively, of Ni—Co/ceria material (prepared as in Examples 8 and 9, respectively).

What is claimed is:

1. A sulfur tolerant anode current collector material in the form of a mesh or foam comprising a metallic mesh or foam material infiltrated and coated with a cermet coating, such that the internal and external surfaces of the metallic mesh or foam have said cermet coating thereon, wherein the cermet comprises a metallic component and a ceramic component, the metallic component comprising nickel, an alloy including nickel and cobalt, or a mixture including a nickel compound and a cobalt compound, and the ceramic component comprises a doped ceria electrolyte material.

2. The sulfur tolerant anode current collector material of claim 1, wherein the doped ceria electrolyte material comprises a gadolinium doped ceria, a samarium doped ceria, a zirconium doped ceria, a scandium doped ceria, a yttrium doped ceria, a calcium doped ceria, a strontium doped ceria, a rare earth element doped ceria, an alkaline earth element doped ceria, or combinations thereof.

3. The sulfur tolerant anode current collector material of claim 1, wherein the cermet material comprises from 20 to 80 percent by weight of said doped ceria electrolyte material, and further wherein said doped ceria electrolyte material comprises gadolinium doped ceria, samarium doped ceria, or a combination thereof.

4. The sulfur tolerant anode current collector material of claim 1, wherein the metallic material comprises nickel, copper, ferritic stainless steel, or a combination thereof.

5. The sulfur tolerant anode current collector material of claim 1, wherein the mesh or foam comprises at least 10 mg/cm² of the cermet material.

6. The sulfur tolerant anode current collector material of claim 1, wherein the mesh or foam comprises at least 10 mg/cm² of the cermet material, and the metallic component of the cermet comprises nickel and cobalt.

7. A solid oxide fuel cell for use with a reducing gas, the solid oxide fuel cell comprising:
    a cathode layer;
    a ceramic electrolyte layer positioned adjacent the cathode layer;
    an anode layer positioned adjacent the ceramic electrolyte layer;
    an interconnect layer; and
    a sulfur tolerant anode current collector layer positioned adjacent the anode layer between the interconnect layer and the anode layer;
    wherein the sulfur tolerant anode current collector layer comprises a mesh or foam comprising a cermet, wherein the cermet comprises a metallic component and a ceramic component, the metallic component comprises nickel, an alloy including nickel and cobalt, or a mixture including nickel and cobalt compounds, and wherein the ceramic component comprises a doped ceria electrolyte material.

8. The solid oxide fuel cell of claim 7, wherein the doped ceria electrolyte material comprises a gadolinium doped ceria, a samarium doped ceria, a zirconium doped ceria, a scandium doped ceria, a yttrium doped ceria, a calcium doped ceria, a strontium doped ceria, a rare earth element doped ceria, an alkaline earth element doped ceria, or combinations thereof.

9. The solid oxide fuel cell of claim 7, wherein the cermet material comprises from 20 to 80 percent by weight of said doped ceria electrolyte material, and further wherein said doped ceria electrolyte material comprises gadolinium doped ceria, samarium doped ceria, or a combination thereof.

10. The solid oxide fuel cell of claim 7, wherein the mesh or foam further comprises a metallic material.

11. The solid oxide fuel cell of claim 10, wherein the metallic material comprises nickel, copper, ferritic stainless steel, or a combination thereof.

12. The solid oxide fuel cell of claim 10, wherein the mesh or foam comprises at least 20 wt % of the cermet material.

13. A solid oxide fuel cell for use with a reducing gas, the solid oxide fuel cell comprising:
a cathode layer;
a ceramic electrolyte layer positioned adjacent the cathode layer;
an anode layer positioned adjacent the ceramic electrolyte layer;
an interconnect layer; and
a sulfur tolerant anode current collector layer positioned adjacent the anode layer between the interconnect layer and the anode layer;
wherein the sulfur tolerant anode current collector layer is in the form of a mesh or foam comprising a metallic mesh or foam material infiltrated and coated with a cermet coating that conducts electricity by transport of both electrons and oxygen ions, such that the internal and external surfaces of the metallic mesh or foam have said cermet coating thereon, wherein the cermet comprises a metallic component and a ceramic component, the metallic component comprising nickel, an alloy including nickel and cobalt, or a mixture including a nickel compound and a cobalt compound, and the ceramic component comprising a doped ceria electrolyte component.

14. The sulfur tolerant anode current collector of claim 6, wherein the metallic component comprises an alloy of nickel and cobalt.

15. The solid oxide fuel cell of claim 7, wherein the metallic component of the cermet comprises an alloy of nickel and cobalt.

16. The sulfur tolerant anode current collector material of claim 1, wherein the metallic component of the cermet coating comprises an alloy of nickel and cobalt.

17. The solid oxide fuel cell of claim 10, wherein the current collector comprises a mesh or foam of said metallic material infiltrated with a coating of the cermet.

18. The solid oxide fuel cell of claim 17, wherein said metallic material comprises nickel.

19. The sulfur tolerant anode current collector material of claim 1, wherein said metallic material comprises nickel.

20. A solid oxide fuel cell for use with a reducing gas, the solid oxide fuel cell comprising:
a cathode layer;
a ceramic electrolyte layer positioned adjacent the cathode layer;
an anode layer positioned adjacent the ceramic electrolyte layer; and
a sulfur tolerant anode current collector layer comprising the current collector material of claim 1 positioned adjacent the anode layer.

21. The solid oxide fuel cell of claim 13, wherein the metallic component of the cermet coating comprises an alloy of nickel and cobalt.

22. A solid oxide fuel cell stack comprising a plurality of fuel cells of claim 7 in a stacked arrangement, with adjacent fuels cells arranged such that the interconnect layer of a fuel cell is located between the anode current collector of that cell and the cathode layer of the adjacent cell such that the interconnect layer will conduct electricity between adjacent fuel cells.

* * * * *